United States Patent
Lenzi et al.

(10) Patent No.: US 10,327,577 B2
(45) Date of Patent: Jun. 25, 2019

(54) DEVICE FOR SEPARATING TWO SPACES FROM ONE ANOTHER

(71) Applicants: KONINKLIJKE PHILIPS N.V., Eindhoven (NL); KONINKLIJKE DOUWE EGBERTS B.V., Utrecht (NL)

(72) Inventors: Cesare Lenzi, Granaglione (IT); Marco Marchi, Marzabotto (IT); Andrea Pecci, Castel di Casio (IT)

(73) Assignees: KONINKLIJKE PHILIPS N.V., Eindhoven (NL); KONINKLIJKE DOUWE EGBERTS B.V., Utrecht (NL)

( * ) Notice: Subject to any disclaimer, the term of this patent is extended or adjusted under 35 U.S.C. 154(b) by 745 days.

(21) Appl. No.: 14/352,847

(22) PCT Filed: Oct. 9, 2012

(86) PCT No.: PCT/IB2012/055439
§ 371 (c)(1),
(2) Date: Apr. 18, 2014

(87) PCT Pub. No.: WO2013/057625
PCT Pub. Date: Apr. 25, 2013

(65) Prior Publication Data
US 2014/0251149 A1    Sep. 11, 2014

Related U.S. Application Data

(60) Provisional application No. 61/549,788, filed on Oct. 21, 2011.

(51) Int. Cl.
*A47J 31/42*    (2006.01)
*A47J 42/50*    (2006.01)

(52) U.S. Cl.
CPC ............... *A47J 31/42* (2013.01); *A47J 42/50* (2013.01)

(58) Field of Classification Search
CPC .................................. A47J 31/42; A47J 42/50
(Continued)

(56) References Cited

U.S. PATENT DOCUMENTS

| 94,116 | A | * | 8/1869 | Irwin | ...................... | E04F 11/02 |
| | | | | | | 454/237 |
| 454,298 | A | * | 6/1891 | Shempp | .................. | A47G 29/12 |
| | | | | | | 232/19 |

(Continued)

FOREIGN PATENT DOCUMENTS

| AU | 2009202515 A1 | 6/2009 |
| CN | 1761604 | 4/2006 |

(Continued)

OTHER PUBLICATIONS http://www.lansdownelife.com/2011/06/refinishing-my-81-year-old-front-door.html.*

*Primary Examiner* — Tu B Hoang
*Assistant Examiner* — Joseph M Baillargeon

(57) ABSTRACT

A device for separating a first space and a second space from one another is disclosed. The device comprises a partition wall, arranged such that the first space and the second space are located on opposite sides of said partition wall. The partition wall is provided with a through aperture, which connects the first space and the second space and allows a bulk material to move from the first space into the second space. A shutter is provided, slidingly movable with respect to the partition wall, for selectively opening and closing the through aperture. The shutter has a port, which can be (Continued)

selectively brought in an alignment position and in an out-of-alignment position with respect to the through aperture.

17 Claims, 9 Drawing Sheets

(58) Field of Classification Search
USPC .......... 141/268, 346, 384; 99/318, 275, 286, 99/304, 316, 412, 295; 222/162, 449, 48, 222/557
See application file for complete search history.

(56) References Cited

U.S. PATENT DOCUMENTS

| | | | |
|---|---|---|---|
| 1,725,942 A | 1/1927 | Stimpson | |
| 3,129,845 A * | 4/1964 | Walton | A61J 7/04 188/268 |
| 4,053,087 A * | 10/1977 | Lack | G01F 11/24 222/278 |
| 5,947,171 A * | 9/1999 | Woodruff | B65D 23/102 141/346 |
| 6,364,155 B1 * | 4/2002 | Wolfe | B65D 83/0454 221/121 |
| 6,626,085 B1 * | 9/2003 | Lassota | A47J 31/42 241/100 |
| 7,373,756 B2 * | 5/2008 | Okulov | E05F 15/41 49/339 |
| 8,307,513 B1 * | 11/2012 | Fitzgerald | E05D 11/06 16/344 |
| 2004/0123747 A1 | 7/2004 | Lassota | |
| 2007/0290003 A1 * | 12/2007 | Morin | A47J 31/404 222/325 |

FOREIGN PATENT DOCUMENTS

| | | |
|---|---|---|
| EP | 2364624 A2 | 2/2011 |
| WO | 9723155 A1 | 12/1996 |

* cited by examiner

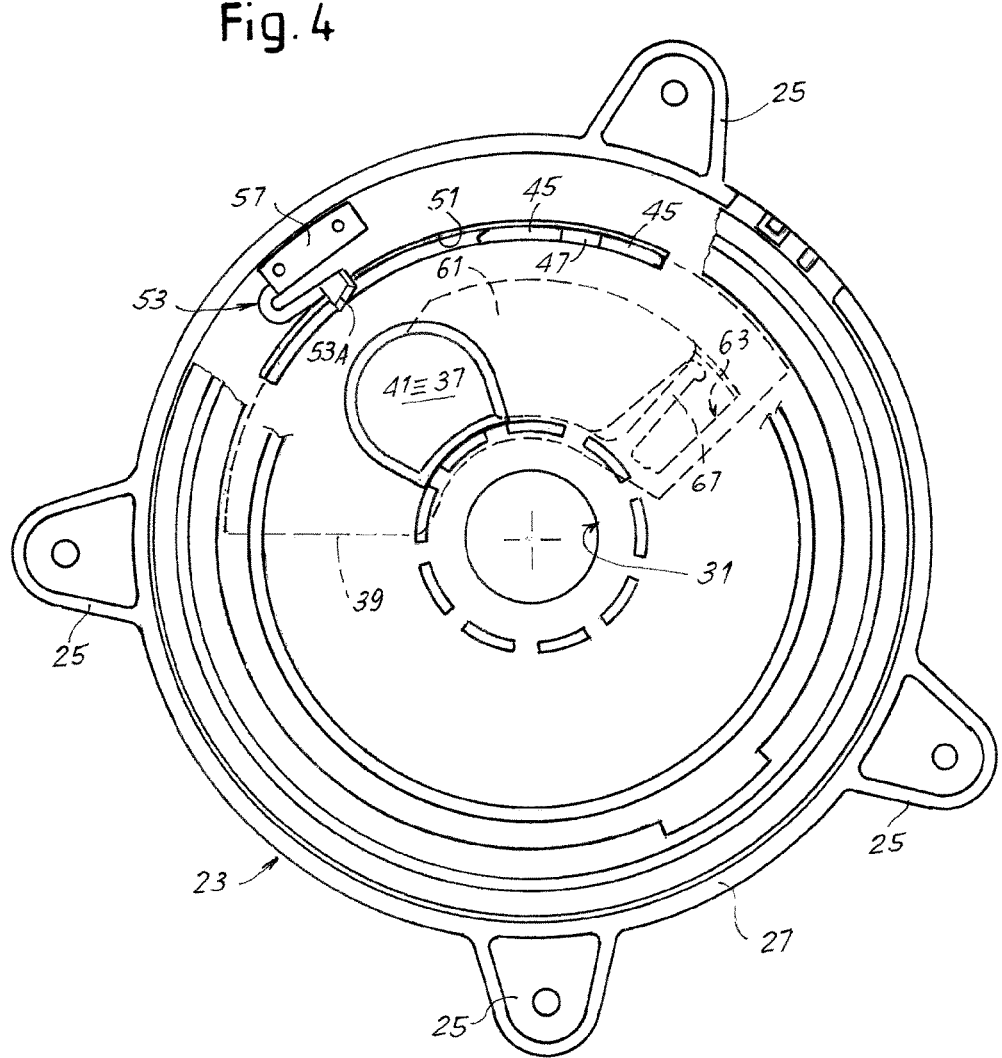

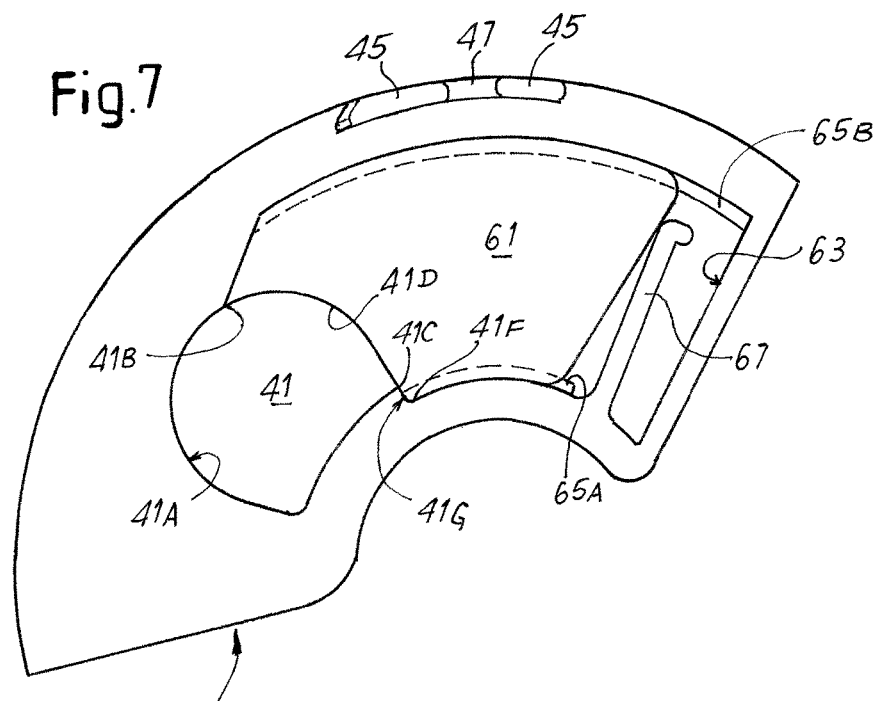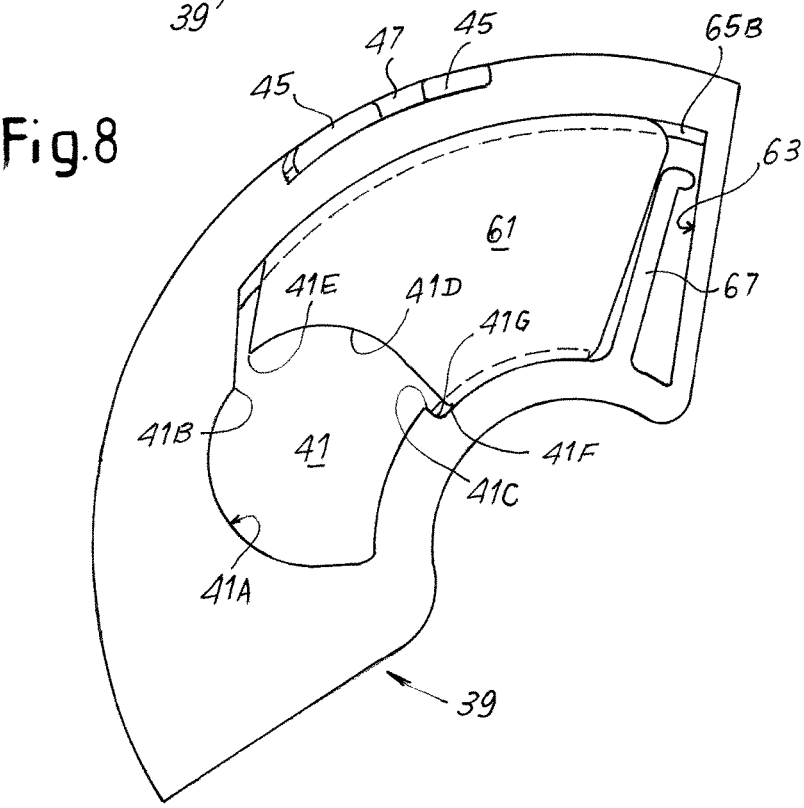

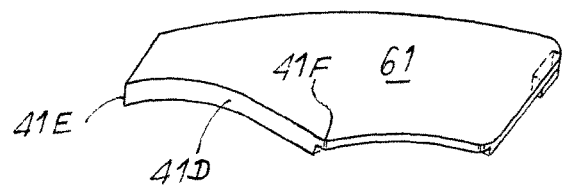
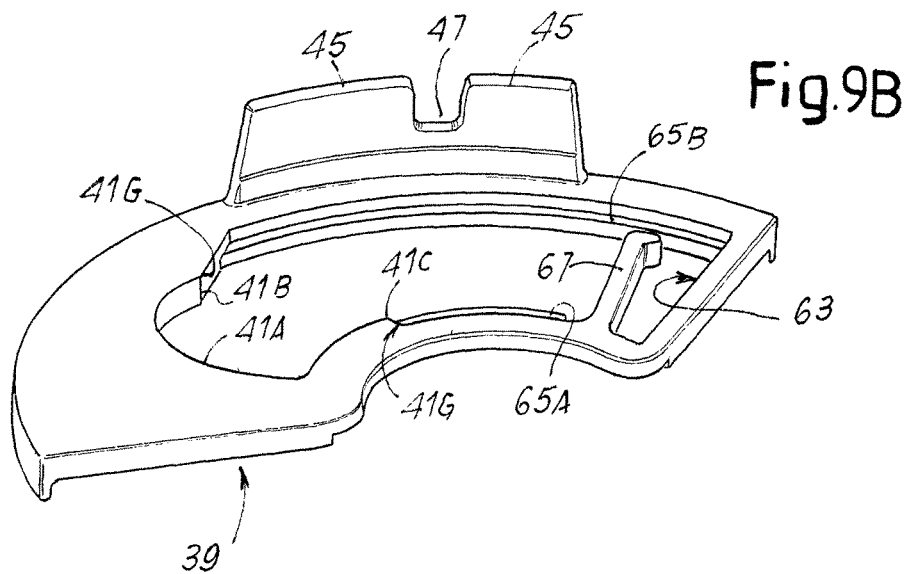

DEVICE FOR SEPARATING TWO SPACES FROM ONE ANOTHER

This application is the U.S. National Phase application under 35 U.S.C. § 371 of International Application No. PCT/IB2012/055439, filed on Oct. 9, 2012, which claims the benefit of U.S. Provisional Application No. 61/549,788 filed on Oct. 21, 2011. These applications are hereby incorporated by reference herein.

TECHNICAL FIELD

The invention relates to a device for alternatively mutually separating or placing into communication two spaces or environments.

BACKGROUND ART

In several kinds of devices and machines the need sometimes arises to selectively put two environments in communication or to separate one environment from the other, alternatively. For example, one space or environment can be formed by a product container, the product contained therein being selectively dispensed in a second space or environment, in which a device acting upon the product is arranged.

In beverage producing machines, for example, containers for beverage ingredients in the form of bulk material, e.g. in granular or powder form, are provided. The ingredients contained in the containers must be selectively dispensed toward a brewing unit, a mixer or any other kind of apparatus, device, or component in which the beverage or a part thereof is prepared, for example using hot water flowing through a metered amount of beverage ingredient(s).

In some circumstances two mutually adjoining spaces or environments must be separated from one another when no flow of product is required from one environment to the other, but they must be placed into communication if a product should flow from one space in the other.

BRIEF DESCRIPTION OF THE INVENTION

The invention provides for a device which efficiently and selectively places two mutually adjoining spaces or environments into communication or separates them one from the other depending upon at least one operative condition.

In the context of the present description and of the appended claims a space or environment shall be understood as a volume which is entirely or partly surrounded by a boundary wall and separated from an adjoining such space or environment. For example an environment or space can be formed by the inner volume of a container, a conveying duct, a channel, a hopper or any other mechanical component which provides a volume which is at least partly surrounded by a closing wall.

According to one embodiment of the invention a device is provided in which a special shutter can be selectively brought in a position in which an aperture placing the two spaces or environment into communication is open or alternatively in a position in which the aperture is closed. If bulk solid material flows from one space to the other passing through the aperture, the risk might arise that the material remains trapped between the aperture and the shutter. According to a preferred embodiment of the invention this is avoided by providing a port in the shutter which has at least one resiliently yielding edge. The yielding edge is moved with respect to the shutter against a resilient force if, during closure of the aperture between the first space and the second space, an obstacle remains trapped between the aperture and the shutter port.

More specifically, according to one embodiment, a device is provided for separating a first space and a second space from one another, comprising: a partition wall, the first space and the second space being arranged on opposite sides of said partition wall; a through aperture in the partition wall connecting the first space and the second space and allowing a bulk material to move from the first space into the second space; a shutter, slidingly movable with respect to the partition wall, for selectively opening and closing said through aperture, the shutter having a port which can be selectively brought in an alignment position and in an out-of-alignment position with respect to said through aperture. The port has a resiliently yielding edge portion which is biased to a rest position and being capable of moving away from said rest position against an elastic biasing force if during closure of said shutter an obstacle obstructs the movement of the shutter with respect to the partition wall.

In some embodiments the partition wall comprises a first guide for guiding the shutter with respect to the partition wall during opening and closing of the aperture.

In some embodiments the shutter moves according to a circular trajectory with respect to said partition wall.

According to preferred embodiments the resiliently yielding edge of the port of the shutter is formed by a resiliently biased slider, slidably engaged to the shutter. The shutter can comprise a second guide for the resiliently biased slider, to guide the latter with respect to the shutter. The above mentioned first and second guide can be substantially parallel to one another.

In some embodiments the shutter comprises a seat in which the resiliently biased slider is slidingly housed, e.g. a seat in the form of a window formed in said shutter. The slider can be resiliently biased by a resilient member arranged in said seat, said resilient member biasing the slider towards a rest position corresponding to a minimum cross section of said port. The resilient member can be a separate member, arranged between the slider and the shutter. In preferred embodiments the resilient member is formed by an elastic projection integrally formed by the same material, e.g. plastic material, forming the shutter.

The invention also concerns a coffee machine comprising a brewing unit, a coffee grinder and a device as above described, arranged above said grinder. The device separates a space or environment in which coffee beans are contained from a channel conveying the beans towards the grinder.

According to a further aspect, the invention concerns a machine for delivering an edible product, such as a beverage or food, comprising a device as described here above.

The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 2A illustrates an enlargement of detail marked IIA of FIG. 2;

FIG. 4 illustrates a plan view according to line IV-IV in FIG. 2, with the coffee beans container removed and the shutter in the open position;

FIGS. 7 and 8 illustrate a top view of the shutter in two different positions;

FIGS. 9A and 9B illustrate the two components of the shutter in a perspective view and disassembled condition.

DETAILED DESCRIPTION OF EMBODIMENTS THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The following description refers to an application of the invention in a coffee machine, but it should be understood that the invention can be embodied in other different kinds of beverage producing machines or also in different kinds of apparatus, machines or devices for handling edible products, where similar problems arise, as will be described in more detail here below, such as the risk of bulk material remaining trapped between an aperture, where through the bulk edible material is intended to flow, and a slider arranged to open and close said aperture.

Figure 1:
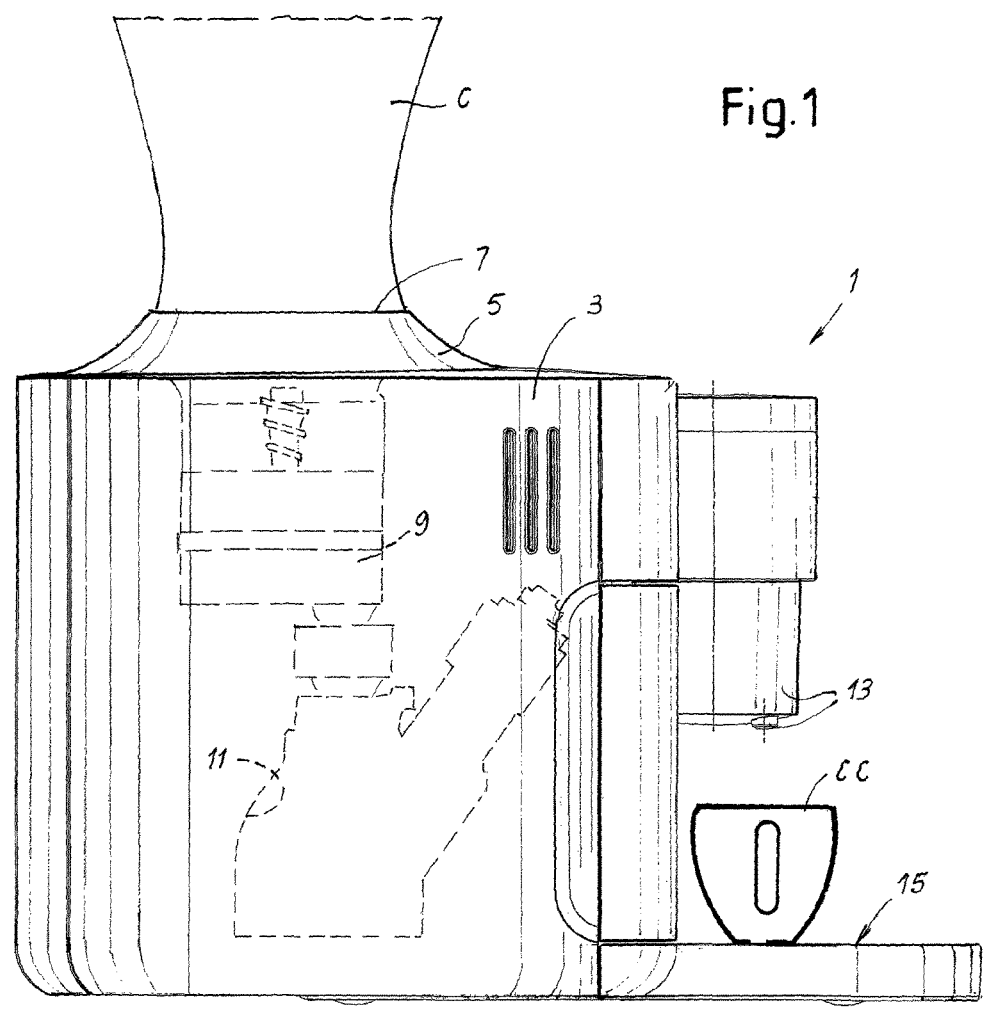
FIG. 1 illustrates a side view of a coffee machine with a container of coffee beans and a coffee grinder.

FIG. 1 shows a side view of a coffee machine embodying the invention. The coffee machine 1 includes a housing 3 with a top ceiling 5 having a seat 7 in which a coffee beans container C can be introduced and engaged with the outlet opening of the container C oriented downwardly in order to dispense coffee beans to a coffee grinder 9 arranged inside the housing 3 of the machine 1. The grinder 9 grinds coffee beans dispensed from the coffee beans container to produce coffee powder dispensed to a brewing unit 11, also housed in the housing 3 of the coffee machine 1. The grinder 9 and the brewing unit 11 are known per se and will not be described in great detail herein.

The machine 1 also includes a coffee dispensing spout 13 placed above a grid 15 on which a coffee cup CC or another suitable beverage container can be placed, such as a glass, a bowl or the like, in which the beverage dispensed by the dispensing spout 13 is collected.

In some embodiments the coffee beans container C can be a removable package, e.g. a disposable or re-usable package, which the user connects to the coffee machine and replaces once it is empty, i.e. when the coffee beans contained in the package has been entirely used. The interior of the coffee beans container C defines a first space or environment from which the coffee beans must be dispensed towards the coffee grinder 9. A channel 9A is arranged between the coffee beans container C and the coffee grinder 9, to convey and/or dose the coffee beans from the container C towards the coffee grinder 9. The channel 9A defines a second space or environment, which must be put into communication with the space or environment formed by the interior of the coffee beans containers C when the latter is attached on the top of the coffee machine 1.

When the coffee beans container C is removed from the machine, for example in order to replace an empty container with a full container, or to replace a container containing one kind of coffee beans (e.g. regular coffee) with one containing a different kind of coffee beans (e.g. decaffeinated coffee, the aperture in the coffee machine, through which the coffee beans enter the channel 9A, must be closed. Underneath the seat 7 provided in the ceiling of the coffee machine housing 3 a device according to the invention is arranged, which provides for selectively opening and closing the entrance of the channel 9A.

Figure 2:
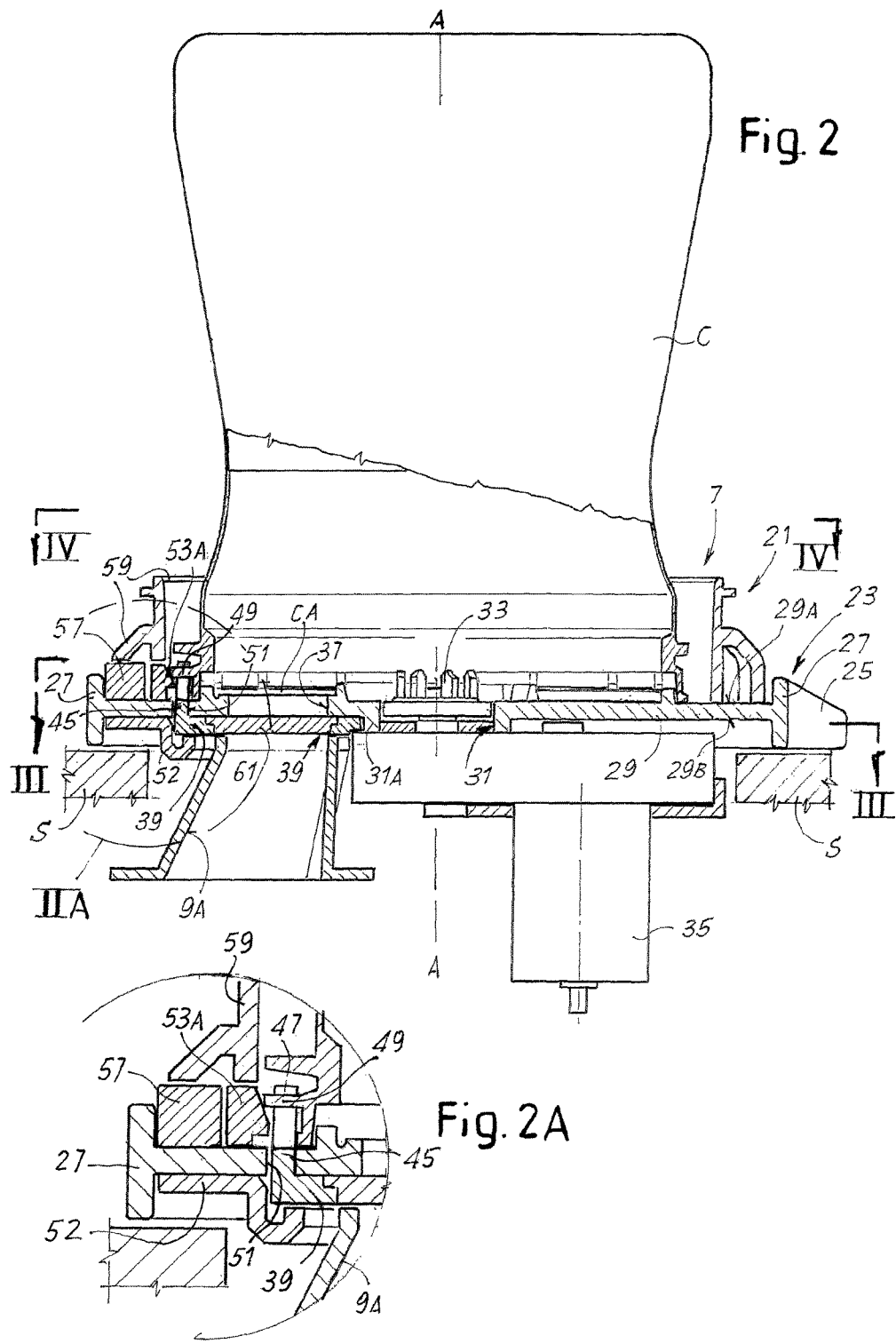
FIG. 2 illustrates a partial cross-section of the interface between the coffee beans container and the machine.
Figure 3:
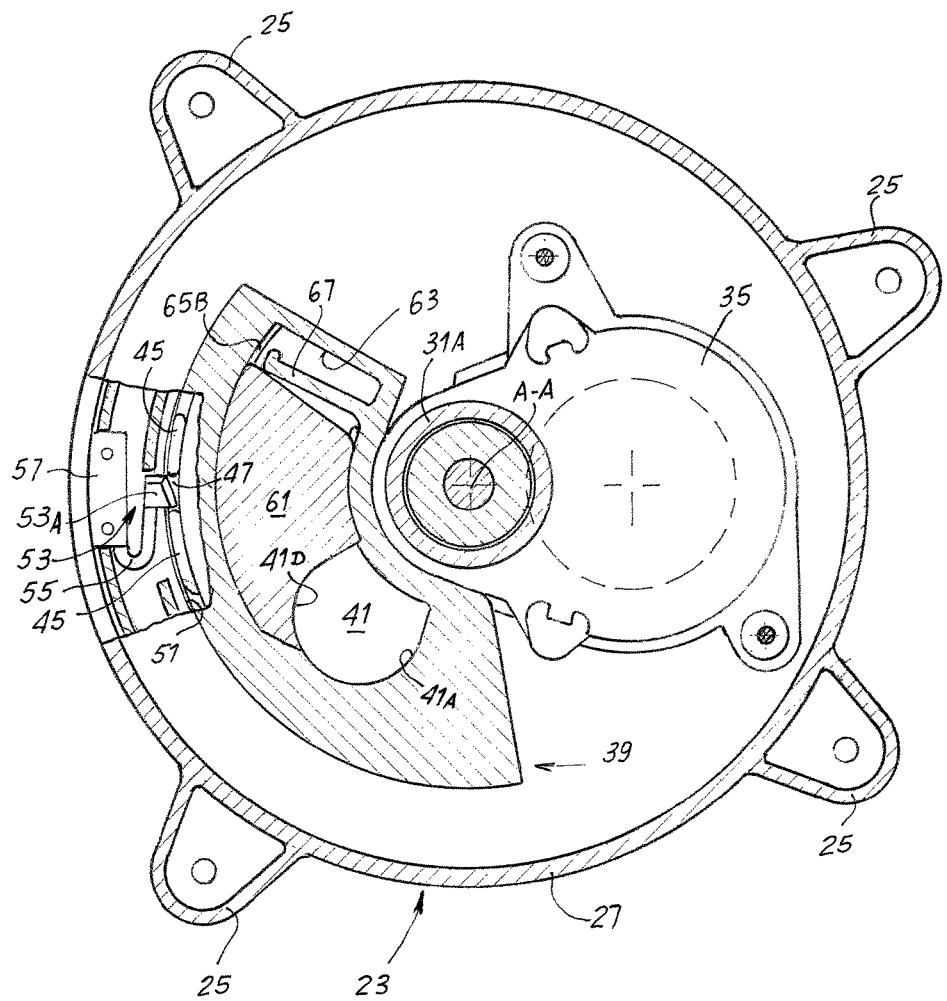
FIG. 3 illustrates a cross section according to line III-III of FIG. 2.

In FIG. 2 a section according to vertical plane of the device, designated 21 as a whole, is shown. FIG. 3 shows a cross section according to line III-III in FIG. 2.

The device 21 comprises a frame 23 which, in the embodiment shown herein, is approximately circular in shape. The frame 23 comprises feet 25 for connection to the stationary structure S of the coffee machine 1. Feet 25 are arranged around a circumferential cylindrical wall 27. The wall 27 surrounds a flat laminar diaphragm 29 having a first face 29A and a second face 29B. The diaphragm forms a partition wall which separates two spaces or environments formed by the coffee beans container C attached to the machine 1 and the channel 9A. Face 29A is oriented outwardly, towards the coffee beans container C when the latter is mounted on the machine 1, while face 29B is oriented toward the interior of the housing 3 of the coffee machine 1.

In some embodiments, as illustrated in the drawings, the central diaphragm 29 has a central aperture 21 through which a dispensing rotor 33 projects. The rotor 33 acts upon a dispensing device, (not shown) contained in the container C in order to dispense the coffee beans contained therein in the channel 9A. The rotor 33 in drawn into rotation by a motor 35 mounted inside the housing 3 of the coffee machine 1.

The diaphragm 29 is provided with a through aperture 37, through which coffee beans can be dispensed from the coffee beans container C in the channel 9A and to the coffee grinder 9. When the coffee beans container C is attached to the device 21 the aperture 37 must be open to allow dispensing of the coffee beans to the coffee grinder 9. When the coffee container is removed, the aperture 37 must be closed, in order to protect the component inside the machine, preventing dirt from penetrating inside the machine, and also for safety reasons.

Figure 4A:
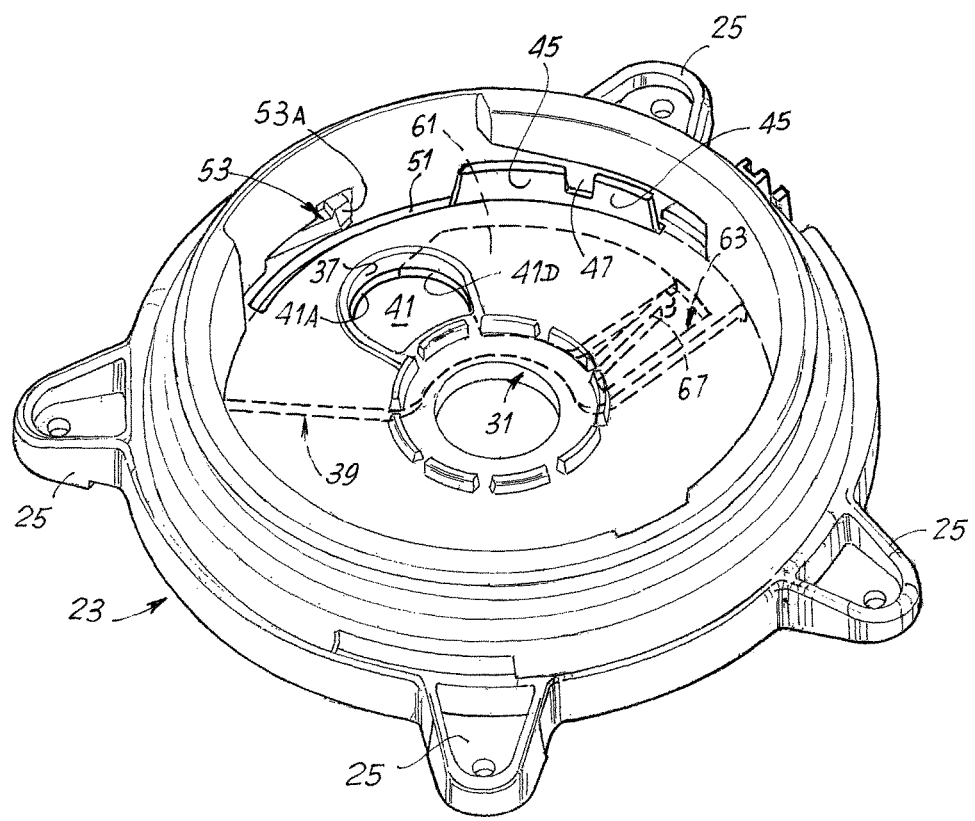
FIG. 4A illustrates a perspective view of the frame including the shutter in the open position.
Figure 6:
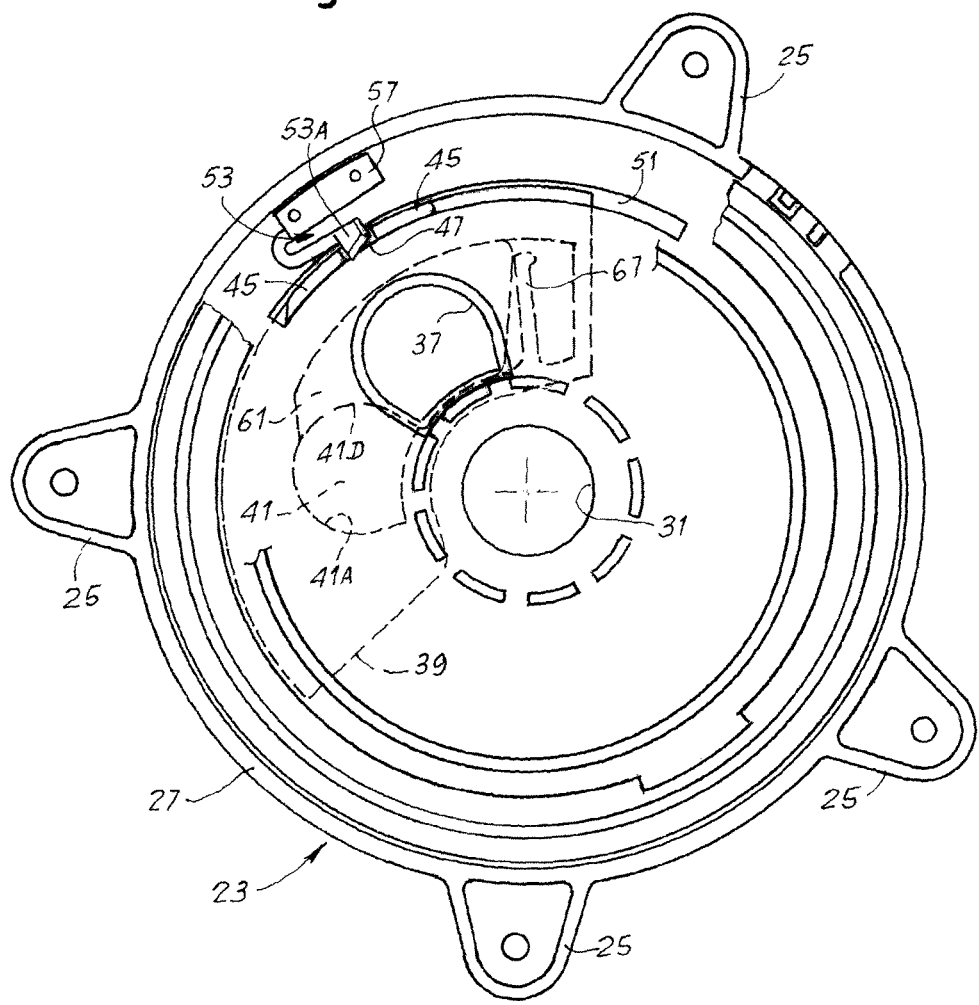
FIG. 6 illustrates a plan view similar to FIG. 4, with the shutter in the correct closed position.

In order to selectively open and close the aperture 37 the device 21 comprises a shutter 39. The shutter 39 has a laminar shape, i.e. it is substantially be-dimensional and can be formed as a single piece of moulded plastic. The shutter 39 is provided with a port 41. When the shutter 39 is in the open position the port 41 is aligned to the aperture 37 formed in the diaphragm 29 of the frame 23, see FIG. 4. In the closed position, i.e. when the container C is removed, the shutter 39 is rotated in such a position that the port 41 is out of alignment with respect the aperture 37, see FIG. 6. In this position the two spaces, namely the environment formed by the interior of container C and the environment formed by the channel 9A, are separated one from the other.

In the embodiment illustrated in the drawings the shutter 39 moves according to a circular trajectory coaxial to the container C, because the movement of the shutter 39 is controlled directly by the container C when the latter is connected or disconnected from the device 21 as it will be discussed later on. In other embodiments, the shutter 39 could be differently activated or controlled. In some embodiments the shutter could be actuated by an external actuator or by other different devices. Depending upon the manner in which the shutter is controlled or acted upon to control opening and closing thereof, the movement of the shutter can be along a non-circular trajectory, e.g. a rectilinear trajectory.

The shutter 39 can be provided with a control member through which an opening and closing movement is imparted to the shutter 39. For example, on the upper face of the shutter 39, i.e. the face oriented towards the container C, the shutter 39 can be provided with a projection 45. In some embodiments the projection 45 includes an intermediate recess 47. The coffee beans container C is provided in turn with an appendage 49 (see FIG. 2) suitable to engage in the recess 47 of the projection 45. The projection 45 and the recess 47 form a control member which is acted upon by the container C via the appendage 49, such that when the container C is introduced in the seat 7 and rotated to engage the seat 7, e.g. by means of a bayonet-type connection, the rotation of the container C is transmitted to the shutter 39 (see also FIG. 2A). The container C is moved into the seat 7 such that the appendage 49 engages the recess 47 and once the coffee beans container is in the correct axial position, it is rotated around axis A-A and draws the shutter 39 from a closed position (with the port 41 out of alignment with respect to the aperture 37, FIG. 6) in a open position (with a port 41 in alignment with the apertures 37, FIG. 4). This angular movement of the coffee beans containers C also causes engagement of the coffee beans container C to the device 21 by means of a bayonet-like connection or the like.

In some embodiments the shutter 39 is arranged underneath the diaphragm 29 while the projection 45 projects through the diaphragm 29 and from the upper face 29A of the diaphragm 29. To this end an arched slit 51 is provided in diaphragm 29. In order for the shutter 39 to move according to a circular trajectory coaxial to the coffee beans container C, the arched slit 51 has the shape of a portion of a circumference with a center on axis A-A. The slit 51 forms a guide for the shutter 39. The shutter 39 can be further guided by a ring shaped projection 31A surrounding the central aperture 31 of the diaphragm 29. The shutter 39 is retained by a retention plate 52 attached to the lower surface 29B of the diaphragm 29.

In some embodiments the device 21 comprises a latch 53 which selectively engages the shutter 39 to maintain it in the closed position when no coffee beans container C is attached to the machine 1. In some embodiments the latch 53 comprises a resilient tag 53A which engages the recess 47 of the projection 45 when the shutter 39 is in its closed position. In some embodiments the tag 53A is formed at the end of a resilient arm or a spring 55 which can be integrally formed as an extension of a block 57 retained between the frame 23 and a flange 59 constrained to frame 23 (see FIGS. 2 and 3). When the container C is connected to the device 21, the appendage 49 (FIG. 2) provided on the container forces the tag 53A out of the recess 47 and engages the projection 45, such that rotation of the container C around its own axis will draw into rotation the projection 45 and thus the shutter 39. In some embodiments the upper surface of the tag 53A slanted such that the vertical force applied by the projection 49 of the container C will push the tag 53A radially outwardly out of engagement with the recess 47, such that the shutter 39 can be freely follow the rotation movement of the container C.

As it can be seen in particular in FIGS. 3 and 7, the port 41 of the shutter 39 has an edge formed by two mechanical elements. A first portion 41A of the edge extending from a point 41B to a point 41C is formed by the main body of the shutter 39. A remaining portion 41D of the edge is formed by a laminar slider 61. The laminar slider 61 is resiliently yielding as will be disclosed here below. For that purpose the slider 61 is arranged in a seat 63 formed as a window in the shutter 39. The seat 63 is placed adjacent the port 41. If the slider 61 is removed from the shutter 39 (see FIGS. 9A, 9B, the window forming the seat 63 defines along with the port 41 a single empty space through the shutter 39.

The slider 61 is slidingly engaged by opposite ridges 65A, 65B extending along two opposed curved edges of the seat 63. In FIGS. 3, 4, 6 and 7 the slider 61 is arranged in a rest position in which the edge 41D formed on the slider 61 is placed adjacent the edge 41A formed on the main body of the shutter 39 such that the port 41 takes up its minimum dimension. This position is defined by abutments 41G (see in particular FIGS. 9A, 9B) formed on the main body of the shutter 39. The slider 61 is resiliently biased in this position by a spring 67. In some embodiments spring 67 is integrally formed of the same material forming the main body of shutter 39. In some embodiments the spring 67 projects from the edge of the seat 63 along which the ridge 65A is provided towards the opposite edge along which the ridge 65B is arranged. The plastic material forming the main body of the shutter 39 and the laminar spring 67 is sufficiently resilient such that an elastic force generated by the spring 67 biases the slider 61 in the rest position (FIGS. 3, 4, 6, 7) where the port 41 has the minimum cross-section.

Figure 5:
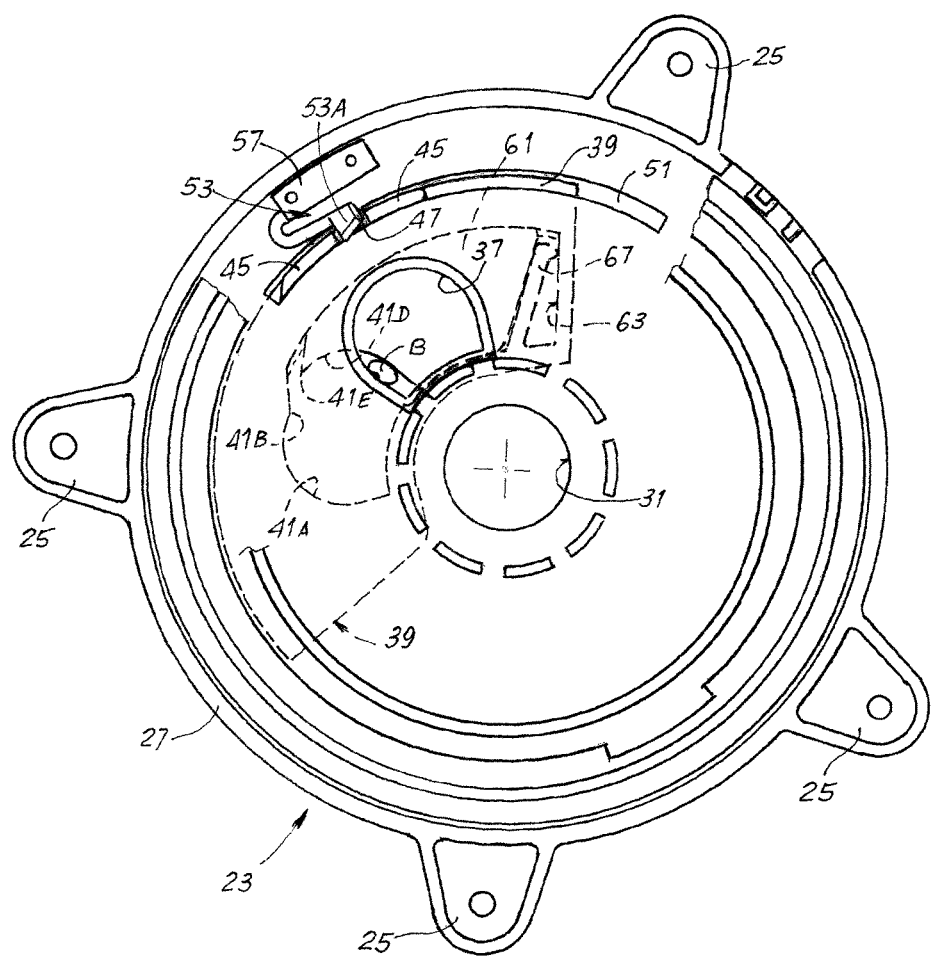
FIG. 5 illustrates a plan view similar to FIG. 4, with a coffee bean obstructing the closure of the shutter.

If during the closure movement of the shutter 39 a solid obstacle, such as a coffee bean remains trapped between the edge of the aperture 37 formed in the diaphragm 29 and the portion 41D of the edge surrounding the port 41, the slider 61 elastically yields allowing the shutter 39 to further move towards the closing position without the risk of projection 45 or the appendage 49 being broken. The resiliently biased slider 61 is blocked in a fixed position due to the coffee bean trapped in the aperture 37 and continued movement of the shutter 39 causes the laminar spring 37 to bias while the shutter 39 moves towards the closed position. In FIG. 5 (where the container C has been removed to show the structure of the device 23 and the operation thereof) a coffee bean B is trapped between aperture 37 and port 41. The spring 67 can bend to such an extent that the shutter 39 reaches its end closure position thus allowing the coffee beans container C to be removed. When the coffee beans container C is removed, the elastic thrust exerted by the edge portion 41D against the coffee bean remained trapped between the latter and the edge of the aperture 37 is sufficient to expel the coffee bean from the aperture. Once the coffee bean is removed the resiliently biased slider 61 snaps in its rest position under the thrust of the laminar spring 67.

The resiliently biased slider 61 therefore defines a resiliently yielding edge or edge portion of the port 41 which allows the shutter 39 to reach its end closing position (where the port 41 is normally out of alignment with respect to the aperture 37) while the resiliently biased slider 61 remains temporarily in a refracted position having deformed the spring 67. This position is maintained until free space is gained for example by removing the coffee beans container C and allowing any obstacle, remained trapped between the edge of the aperture 37 and the edge 41D of the slider 61, to be removed. If the obstacle, for example a coffee bean, does not escape automatically after the coffee beans container has been removed, the user can push the obstacle out of the aperture into channel 9A, for example using a knife or a spoon. Even if the coffee bean B remains trapped the shutter 39 will not be damaged. A new coffee beans container C can be attached to the device and used to reopen the shutter 39. This will automatically cause the coffee bean B remained trapped in the aperture 37 to fall down by gravity in the underneath channel 9A. Integrity of the device 21 is maintained.

The invention claimed is:

1. An edible product dispensing machine comprising:
   a device for separating a first space and a second space from one another, comprising:
   a partition wall, the first space and the second space being arranged on opposite sides of the partition wall;
   a through aperture in the partition wall connecting the first space and the second space and allowing a food bulk material to move from the first space into the second space;
   a shutter, slidingly movable with respect to the partition wall and having a port that is slidable to an alignment position, with respect to the through aperture, wherein the through aperture is open and is slidable to an out-of-alignment position, with respect to the through aperture, wherein the through aperture is closed; and
   a container, wherein the container is forms the first space,
   a brewing unit; and
   a grinder, the grinder being arranged underneath the through aperture, and the through aperture delivers a bulk material from the first space towards the grinder, wherein the port has a resiliently yielding edge portion that is biased by an elastic biasing force towards a rest position, and
   wherein the resiliently yielding edge portion is slidable with respect to the shutter, away from the rest position against the elastic biasing force when the shutter slides to a closing position while an obstruction is encountered during closing.

2. The machine according to claim 1, wherein the partition wall comprises a first guide configured to guide the shutter with respect to the partition wall during opening and closing of the aperture.

3. The machine according to claim 2, further comprising a second guide configured to resiliently slide the shutter with respect to the partition wall, wherein the first guide and the second guide are substantially parallel to one another.

4. The machine according to claim 1, wherein the shutter moves according to a circular trajectory with respect to the partition wall.

5. The machine according to claim 1, wherein the shutter and the resilient member are made of plastic material.

6. The machine according to claim 1, wherein the shutter has a laminar shape.

7. The machine according to claim 1, comprising a latch for locking the shutter with the port in the out-of-alignment position with respect to the through aperture of the partition wall.

8. The machine according to claim 7, wherein the shutter is provided with a projection for engagement with an operating member co-acting with the shutter for moving the shutter respectively in an open position and a closed position and wherein the latch co-acts with the projection.

9. The machine according to claim 1, wherein the shutter is provided with a projection for engagement with an operating member co-acting with the shutter for moving the shutter respectively in an open position and a closed position.

10. The machine according to claim 1, wherein the partition wall comprises a first guide for guiding the shutter with respect to the partition wall during opening and closing of the aperture, wherein the shutter is provided with a projection for engagement with an operating member co-acting with the shutter for moving the shutter respectively in an open position and wherein the projection extends through a slit in the partition wall, the slit forming the first guide for guiding the shutter with respect to the partition wall during opening and closing of the aperture.

11. The machine according to claim 1, wherein the container contains the bulk material.

12. The machine according to claim 11, wherein the machine is configured in the form of a coffee machine and the grinder is a coffee grinder the bulk material comprises coffee beans, and the through aperture being intended for delivering coffee beans from the first space towards the coffee grinder.

13. The machine according to claim 11, wherein the container is engageable in a seat above the partition wall of the device, engagement of the container with the frame causing movement of the shutter to open the through aperture.

14. The machine according to claim 12, wherein the second space is formed by a channel for feeding coffee beans from the container to the coffee grinder.

15. A device for separating a first space and a second space from one another, the device comprising:
   a partition wall, the first space and the second space being arranged on opposite sides of the partition wall;

a through aperture in the partition wall connecting the first space and the second space and allowing a food bulk material to move from the first space into the second space;

a shutter, slidingly movable with respect to the partition wall and having a port that is slidable to an alignment position with respect to the through aperture, wherein the through aperture is open and is slidable to an out-of-alignment position with respect to the through aperture, wherein the through aperture is closed;

wherein the port is defined by an edge portion of a resiliently yielding slider that is biased by an elastic biasing force towards a rest position, wherein the slider is slidable away from the rest position against the elastic biasing force when the shutter slides to a closing position while an obstruction is encountered during closing, wherein the shutter comprises a seat in which the slider is slidingly housed, the device further comprising a resilient member in the seat, the resilient member biasing the slider towards the rest position corresponding to a minimum cross section of the port, wherein the resilient member is formed by an elastic projection integrally formed by the same material forming the shutter.

16. The device according to claim 15, wherein the shutter comprises a second guide for guiding the resiliently biased slider with respect to the shutter.

17. The device according to claim 15, wherein the seat is in the form of a window formed in the shutter.

\* \* \* \* \*